United States Patent
Horikawa et al.

(10) Patent No.: US 11,248,732 B2
(45) Date of Patent: Feb. 15, 2022

(54) GATE VALVE

(71) Applicant: WATERWORKS TECHNOLOGY DEVELOPMENT ORGANIZATION CO., LTD., Osaka (JP)

(72) Inventors: Gou Horikawa, Osaka (JP); Shuhei Azuma, Osaka (JP)

(73) Assignee: WATERWORKS TECHNOLOGY DEVELOPMENT ORGANIZATION CO., LTD., Osaka (JP)

( * ) Notice: Subject to any disclaimer, the term of this patent is extended or adjusted under 35 U.S.C. 154(b) by 665 days.

(21) Appl. No.: 16/095,854

(22) PCT Filed: Dec. 14, 2017

(86) PCT No.: PCT/JP2017/044918
§ 371 (c)(1),
(2) Date: Oct. 23, 2018

(87) PCT Pub. No.: WO2018/123618
PCT Pub. Date: Jul. 5, 2018

(65) Prior Publication Data
US 2021/0222816 A1    Jul. 22, 2021

(30) Foreign Application Priority Data
Dec. 27, 2016 (JP) .............. JP2016-253482

(51) Int. Cl.
*F16K 3/28* (2006.01)
*F16L 55/105* (2006.01)
(Continued)

(52) U.S. Cl.
CPC .............. *F16L 55/105* (2013.01); *F16K 3/28* (2013.01); *F16K 3/314* (2013.01); *F16K 3/316* (2013.01)

(58) Field of Classification Search
CPC .......... F16L 55/105; F16K 3/28; F16K 3/314; F16K 3/316
(Continued)

(56) References Cited

U.S. PATENT DOCUMENTS 2,290,251 A * 7/1942 Saunders .................. F16K 3/28
                                                                251/167
2,401,112 A * 5/1946 Saunders .................. F16K 3/28
                                                                251/168
(Continued)

FOREIGN PATENT DOCUMENTS

| DE | 1017431 B1 | 10/1957 |
| GB | 836076 | 6/1960 |

(Continued)

OTHER PUBLICATIONS

European Search Report dated Jul. 14, 2020.
First Chinese Office Action dated May 24, 2019.

*Primary Examiner* — John Bastianelli
(74) *Attorney, Agent, or Firm* — Dilworth & Barrese, LLP

(57) ABSTRACT

A gate valve includes a valve body for insertion through a through-hole formed in the fluid pipe, and a movement mechanism for moving the valve body along the diameter direction, and the valve body includes a valve main body and a seal member that is capable of undergoing elastic deformation and is provided on a holding portion of the valve main body. A core member formed from a material harder than the seal member is embedded between an outer face of the seal member, which is on the lower side in the movement direction, and a leading end face on the protruding side of the holding portion.

7 Claims, 6 Drawing Sheets

(51) Int. Cl.
*F16K 3/314* (2006.01)
*F16K 3/316* (2006.01)

(58) Field of Classification Search
USPC .......................................... 251/326–329, 194
See application file for complete search history.

(56) References Cited

U.S. PATENT DOCUMENTS

| | | | |
|---|---|---|---|
| 2,424,210 A * | 7/1947 | Sutton | F16K 3/28 |
| | | | 251/167 |
| 3,006,597 A | 10/1961 | Hookway | |
| 3,043,555 A | 7/1962 | Breher | |
| 3,763,880 A * | 10/1973 | Leopold, Jr. | F16K 3/28 |
| | | | 137/316 |
| 6,308,726 B2 * | 10/2001 | Sato | F16L 55/105 |
| | | | 137/15.14 |
| 7,819,384 B2 * | 10/2010 | Nakano | F16K 3/186 |
| | | | 251/204 |
| 2003/0222237 A1 | 12/2003 | Maenishi | |
| 2006/0000999 A1 | 1/2006 | Mori | |

FOREIGN PATENT DOCUMENTS

| | | |
|---|---|---|
| JP | S61-140267 U | 8/1986 |
| JP | S63-135692 A | 6/1988 |
| JP | H07-190277 A | 7/1995 |
| JP | H8-109997 A | 4/1996 |
| JP | 2003-343748 A | 12/2003 |
| JP | 2006-16220 A | 1/2006 |
| JP | 2006-17220 A | 1/2006 |
| JP | 2012-067848 A | 4/2012 |
| JP | 2013-155770 A | 8/2013 |
| JP | 2015-197206 A | 11/2015 |

* cited by examiner

GATE VALVE

TECHNICAL FIELD

The present invention relates to a gate valve that includes a valve body that blocks a passage of a fluid pipe.

BACKGROUND ART

As a gate valve having the above configuration, Patent Document 1 discloses technology in which a valve body is inserted into a through-hole ("hole" in this document) formed in a fluid pipe ("pipe" in this document), and a seal member ("elastic seal" in this document) formed on the outer circumferential surface of the valve body is brought into close contact with the circumferential edge of the through-hole and the inner wall of the fluid pipe.

With this gate valve in Patent Document 1, the seal member of the valve body comes into close contact with the circumferential edge of the through-hole, and comes into close contact with the inner wall of the fluid pipe, thus blocking the passage and preventing the leakage of a fluid to the outside.

Also, Patent Document 2 discloses technology in which a seal member ("elastic seal member" in this document) is provided for insertion into a pipe through a through-hole formed in the circumferential wall of the pipe, a pressing member is provided for pressing the seal member, and the seal member is pressed against the inner wall of the pipe (water pipe) by the generation of force in a direction that intersects the insertion direction as the pressing member moves in the insertion direction.

With this gate valve of Patent Document 2, a movable piece is provided inside the seal member, and a configuration is provided for bringing an inclined face of the movable piece into contact with an inclined face of the pressing member in order to obtain force for displacing the movable piece in a diameter direction that intersects the insertion direction as the pressing member moves.

Also, Patent Document 3 discloses technology in which a seal member ("elastic seal member" in this document) covers a valve body core fitting, and a guide portion is provided so as to prevent the seal member from protruding in the axis direction of a pipe when the valve body core fitting is inserted into the pipe.

With this gate valve of Patent Document 3, if the seal member is pressed against the inner wall of the pipe due to displacement in the insertion direction, the guide portion suppresses a problem in which the seal member protrudes in the axis direction of the pipe, and the seal member is capable of undergoing elastic deformation in a direction of being pressed against the inner wall of the pipe.

Furthermore, Patent Document 4 discloses technology in which a gate valve body is inserted into a through-hole formed in a fluid pipe, a seal member ("elastic seal member" in this document) of the gate valve body is brought into contact with the inner wall of the fluid pipe, and the seal member undergoes elastic deformation in a direction orthogonal to the insertion direction due to a contraction operation of a movable pressing member provided on a valve rod.

With this gate valve of Patent Document 4, the gate valve body has a configuration in which the leading end of the valve rod, which is capable of projecting and retracting, is provided with the movable pressing member that is capable of displacement in the projecting and retracting direction, and the seal member is provided so as to span between the valve rod and the movable pressing member. A head portion is provided at the projecting end of the movable pressing member, and when the movable pressing member contracts as the seal member is compressed, the head portion causes the seal member to undergo elastic deformation so as to bulge in a direction orthogonal to the insertion direction, and thus the seal member is pressed against the inner wall of the pipe.

CITATION LIST

Patent Literature

Patent Document 1: JP S63-135692A
Patent Document 2: JP 2003-343748A
Patent Document 3: JP 2006-17220A
Patent Document 4: JP H8-109997A

SUMMARY OF INVENTION

Technical Problem

In the technology described in each of Patent Documents 1 to 4, even in the case where water is to be blocked at an arbitrary position in the water pipe for example, it is possible to block the flow of water in the water pipe at that position without performing an operation for blocking the flow of water on the upstream side.

Also, in order to block the flow of water in the water pipe with use of a gate valve, it is critical for the seal member to be brought into close contact with the inner circumferential surface of the pipe without any gaps, and the technology described in Patent Documents 2 to 4 can conceivably be used to realize such close contact.

However, with the technology described in Patent Document 2, a configuration is necessary for dividing the force applied to the seal member in the insertion direction into force applied in the diameter direction that is orthogonal to the insertion direction, and therefore the number of parts increases.

Also, with the technology described in Patent Document 3, in the case where force for pressing the seal member in the insertion direction is applied, the portion of the seal member that is in contact with the inner wall of the pipe in the insertion direction undergoes the largest amount of elastic deformation, and the amount of elastic deformation decreases along with an increase in the distance from that portion in a direction of separation from the inner wall of the pipe along the insertion direction, and therefore it is thought that a significant effect cannot be obtained even if the guide portion is formed.

Furthermore, with the technology described in Patent Document 4, when the seal member is proactively elastically deformed in the direction orthogonal to the insertion direction of the valve body, it is possible to improve the degree of close contact between the seal member and the inner wall of the pipe in the direction orthogonal to the insertion direction. However, with this configuration, the seal member also deforms in a direction along the pipe axis of the fluid pipe, thus requiring an increase in the size of the seal member required for the seal member to be brought into close contact with the inner wall of the fluid pipe, and this invites an increase in the amount of force required to perform an operation to achieve close contact.

In particular, with the configuration described in Patent Document 4, a certain amount of precision is required in order to support the movable pressing member so as to be able to move relative to the valve rod, and this invites complexity in the configuration.

Note that in the case of a cast iron water pipe for example, the ratio between outer diameter and pipe thickness (wall thickness) is defined with conventional water pipes, and therefore it has been possible to block the flow of water by forming a through-hole with a diameter that corresponds to the outer diameter, and then selecting a gate valve that corresponds to the through-hole.

However, recent years have seen the development of water pipes that have a reduced pipe thickness (wall thickness), and in the case of such reduced-thickness water pipes, even if a through-hole corresponding to the outer diameter is formed and a corresponding gate valve is provided as in conventional technology, there are cases where the amount of deformation of the seal member is insufficient, and therefore even if more force is applied for inserting the valve body, a gap forms between the seal member and the inner wall of the water pipe, and the flow of water cannot be blocked.

Due to these reasons, there is desire for the provision of a gate valve that has a simple configuration and can favorably bring a seal member into close contact with even an inner wall of a fluid pipe that extends orthogonal to the insertion direction, without increasing the amount of force for bringing the seal member into close contact with the inner wall.

Solution to Problem

A gate valve according to a characteristic configuration of the present invention includes: a valve body that is to be inserted into a fluid pipe through a through-hole formed in the fluid pipe, by movement in an insertion direction that conforms to a diameter direction of the fluid pipe; and a movement mechanism that moves the valve body in the insertion direction, wherein the valve body includes a valve main body and a seal member that is capable of undergoing elastic deformation and is provided on the valve main body in a region that covers a holding portion that protrudes in the insertion direction, and when the valve body is moved in the insertion direction by the movement mechanism such that the seal member comes into contact with an inner wall of the fluid pipe and undergoes elastic deformation, the seal member comes into close contact with the inner wall of the fluid pipe and blocks a flow of a fluid in the fluid pipe, and a core member that is separate from the holding portion and is formed by a harder material than the seal member is embedded between an outer face of the seal member on an insertion direction side and a leading end face on a protruding side of the holding portion.

According to this configuration, when the movement mechanism is used to insert the valve main body into the fluid pipe through the through-hole therein, and the outer face of the seal member on the insertion direction side comes into contact with the inner wall of the fluid pipe, pressure applied from the leading end face of the holding portion to the seal member is transmitted to the core member, and pressure is transmitted in a distributed manner from the core member to portion of the seal member on the outer circumferential side, thus making it possible to achieve close contact in a state of suppressing a phenomenon where the portion of the seal member on the outer circumferential side locally deforms a large amount. Also, when this elastic deformation occurs, the core member becomes displaced in a direction of approaching the leading end face of the holding portion along with the elastic deformation, and therefore as this displacement occurs, the seal member becomes compressed between the leading end face of the holding portion and the core member, and this compressed seal member becomes displaced in the diameter direction orthogonal to the insertion direction, and thus can come into close contact with the inner wall of the fluid pipe.

In other words, with this characteristic configuration, due to the core member being embedded inside the seal member, it is possible to eliminate the problem that only a portion of the seal member is locally firmly pressed against the inner wall of the fluid pipe, and even without applying a large load, it is possible to displace a portion of the seal member in the diameter direction orthogonal to the insertion direction and bring the seal member into close contact with the inner wall of the fluid pipe even in the region orthogonal to the insertion direction.

As a result, this configuration provides, with a simple configuration, a gate valve that can favorably bring a seal member into close contact with even the inner wall of the fluid pipe that extends orthogonal to the insertion direction, without increasing the amount of force for bringing the seal member into close contact with the inner wall.

In another configuration, first restriction walls may be formed on an opposing face of the core member that opposes the leading end face of the holding portion, the first restriction walls rising toward the leading end face and extending orthogonal to a pipe axis of the fluid pipe at respective end positions of the opposing face in a direction conforming to the pipe axis.

According to this configuration, if pressure is applied in the state where the outer face of the seal member on the insertion direction side is in contact with the inner wall of the fluid pipe, the seal member becomes compressed between the leading end face of the holding portion and the core member, and the seal member becomes displaced in the direction orthogonal to the insertion direction along with this compression. When this deformation occurs, the first restriction member guides the seal member in the direction orthogonal to the insertion direction and orthogonal to the pipe axis while suppressing protrusion of the seal member in the pipe axis direction, thus making it possible to cause the seal member to deform in the diameter direction orthogonal to the insertion direction and come into close contact with the inner wall of the fluid pipe.

In another configuration, a second distance from the leading end face of the holding portion to an opposing face of the core member may be set larger than a first distance from the outer face of the seal member to an opposing face of the core member.

According to this configuration, the volume of the seal member between the leading end face of the holding portion and the core member is larger than the volume of the seal member in the region from the core member to the outer face of the seal member, and therefore if pressure is applied to the seal member in the insertion direction, it is possible to increase the amount of deformation of the seal member in the direction orthogonal to the insertion direction and reliably bring it into close contact with the inner wall of the fluid pipe.

In another configuration, the leading end face of the holding portion may be formed as a flat face that extends orthogonal to the insertion direction.

According to this configuration, if the valve main body is moved in the insertion direction, the seal member deforms along the flat surface formed at the leading end face of the holding portion, and therefore the seal member is not likely to protrude upward in the insertion direction beyond the leading end face. Accordingly, the seal member is appropriately compressed between the leading end face of the holding portion and the core member, and it is possible to apply a large amount of compressive force to the seal member from the leading end face of the holding portion when this compression occurs, thus effectively causing deformation to occur in the diameter direction orthogonal to the insertion direction.

In another configuration, second restriction walls may be formed on the leading end face of the holding portion, the second restriction walls rising toward the core member and extending orthogonal to a pipe axis of the fluid pipe at respective end positions of the leading end face in a direction conforming to the pipe axis.

According to this configuration, if pressure is applied in the state where the outer face of the seal member on the insertion direction side is in contact with the inner wall of the fluid pipe, the seal member becomes compressed between the leading end face of the holding portion and the core member, and the seal member becomes displaced in the direction orthogonal to the insertion direction along with this compression. When this deformation occurs, the second restriction member guides the seal member in the direction orthogonal to the insertion direction and orthogonal to the pipe axis while suppressing protrusion of the seal member in the pipe axis direction, thus making it possible to cause the seal member to deform in the diameter direction orthogonal to the insertion direction and come into close contact with the inner wall of the fluid pipe.

In another configuration, a slit shaped as a groove that is elongated in a diameter direction of the fluid pipe may be formed in an outer face of the seal member at a position that is between the leading end face of the holding portion and the core member in a view along a pipe axis of the fluid pipe.

According to this configuration, if pressure is applied to the seal member in the insertion direction, the seal member becomes compressed between the leading end face of the holding portion and the core member, and this leads to a phenomenon in which the seal member in that portion undergoes elastic deformation so as to bulge in the pipe axis direction. When this elastic deformation occurs, the gap of the slit increases in size, thus making it possible to reduce the amount of drive force required to operate the movement mechanism.

In another configuration, the second restriction wall may be formed such that when the seal member comes into close contact with the inner wall of the fluid pipe to block the flow of the fluid in the fluid pipe, at least a portion of the core member becomes overlapped with the second restriction wall in a view along a pipe axis of the fluid pipe.

According to this configuration, even if fluid pressure acting in the pipe axis direction applies force to the seal member and the core member for moving in the pipe axis direction, movement of the core member is prevented by the second restriction wall. This consequently suppresses the case where the seal member between the leading end face of the holding portion and the core member protrudes in the pipe axis. Accordingly, by moving the valve main body in the insertion direction, it is possible to cause the seal member to deform in the diameter direction orthogonal to the insertion direction and maintain a state of being in close contact with the inner wall of the fluid pipe.

In another configuration, a restricting protrusion portion that restricts movement of the seal member in a direction opposite to the insertion direction may be formed at a position between the pair of second restriction walls on a base end side of the holding portion.

According to this configuration, when the valve main body is moved in the insertion direction, protrusion of the seal member in the direction opposite to the insertion direction of the holding portion is suppressed by the restricting protrusion portion. As a result, by moving the valve main body in the insertion direction, it is possible to sufficiently ensure the deformation amount of the seal member with respect to deformation in the diameter direction orthogonal to the insertion direction. Moreover, the seal member is not likely to protrude in the direction opposite to the insertion direction, and therefore by moving the valve main body in the insertion direction, it is possible to prevent a defect in which the seal member abuts against the through-hole of the fluid pipe and becomes damaged.

DESCRIPTION OF EMBODIMENTS

Hereinafter, embodiments of the present invention will be described with reference to the drawings.

(Basic Configuration)

Figure 1:
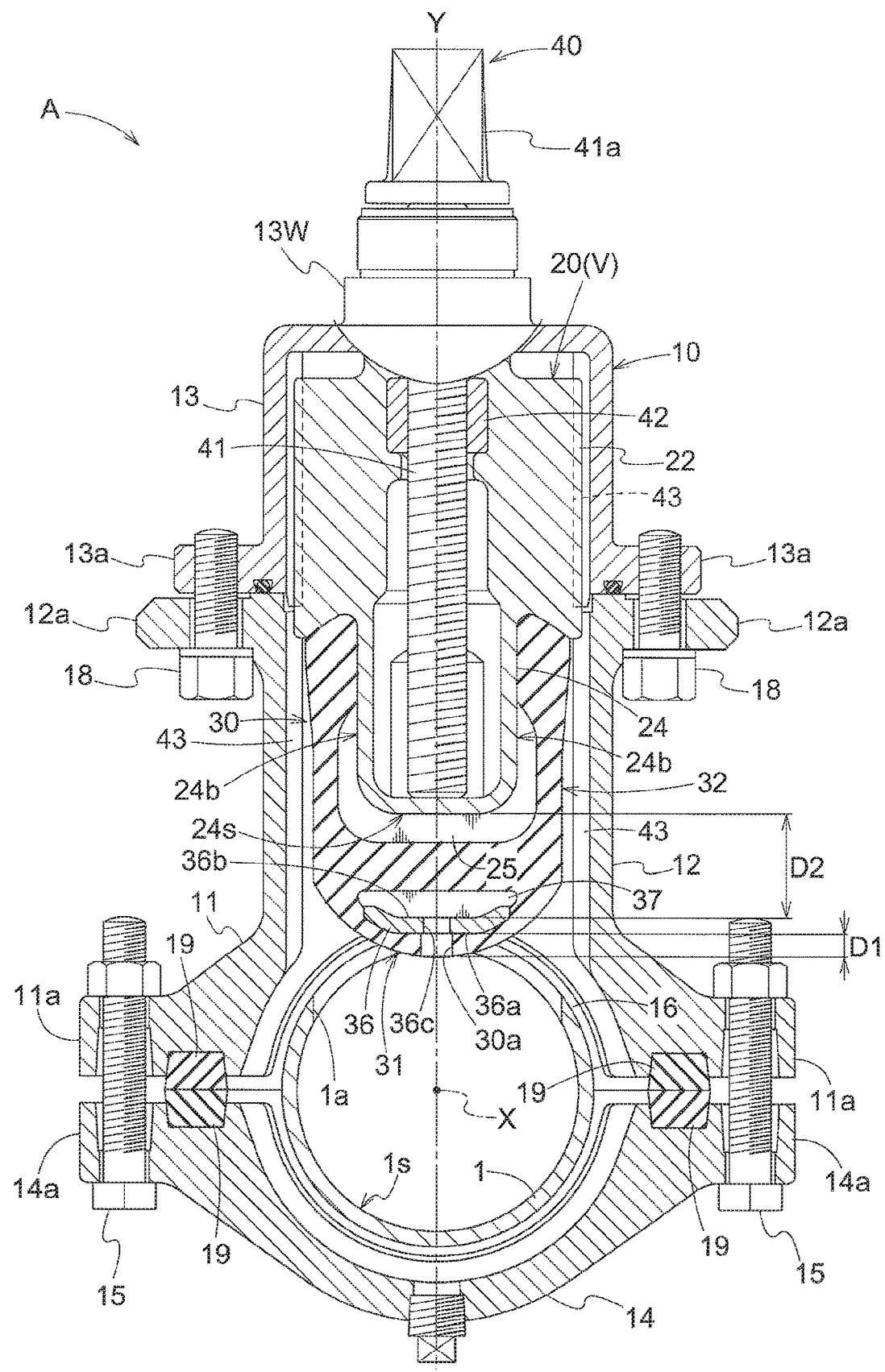
FIG. 1 is a vertical cross-sectional plan view of a gate valve and a fluid pipe.
Figure 2:
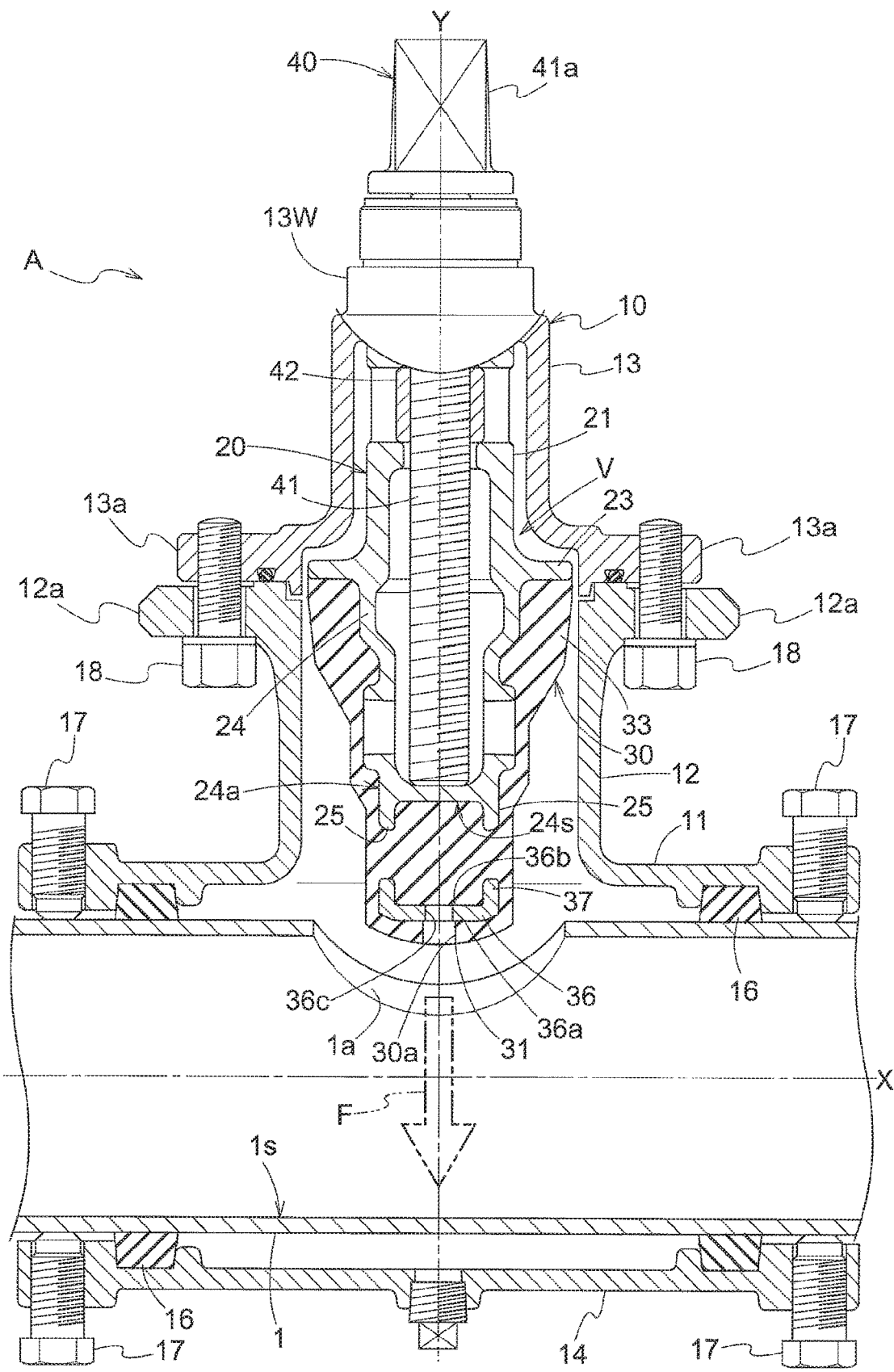
FIG. 2 is a vertical cross-sectional side view of the gate valve and the fluid pipe.
Figure 3:
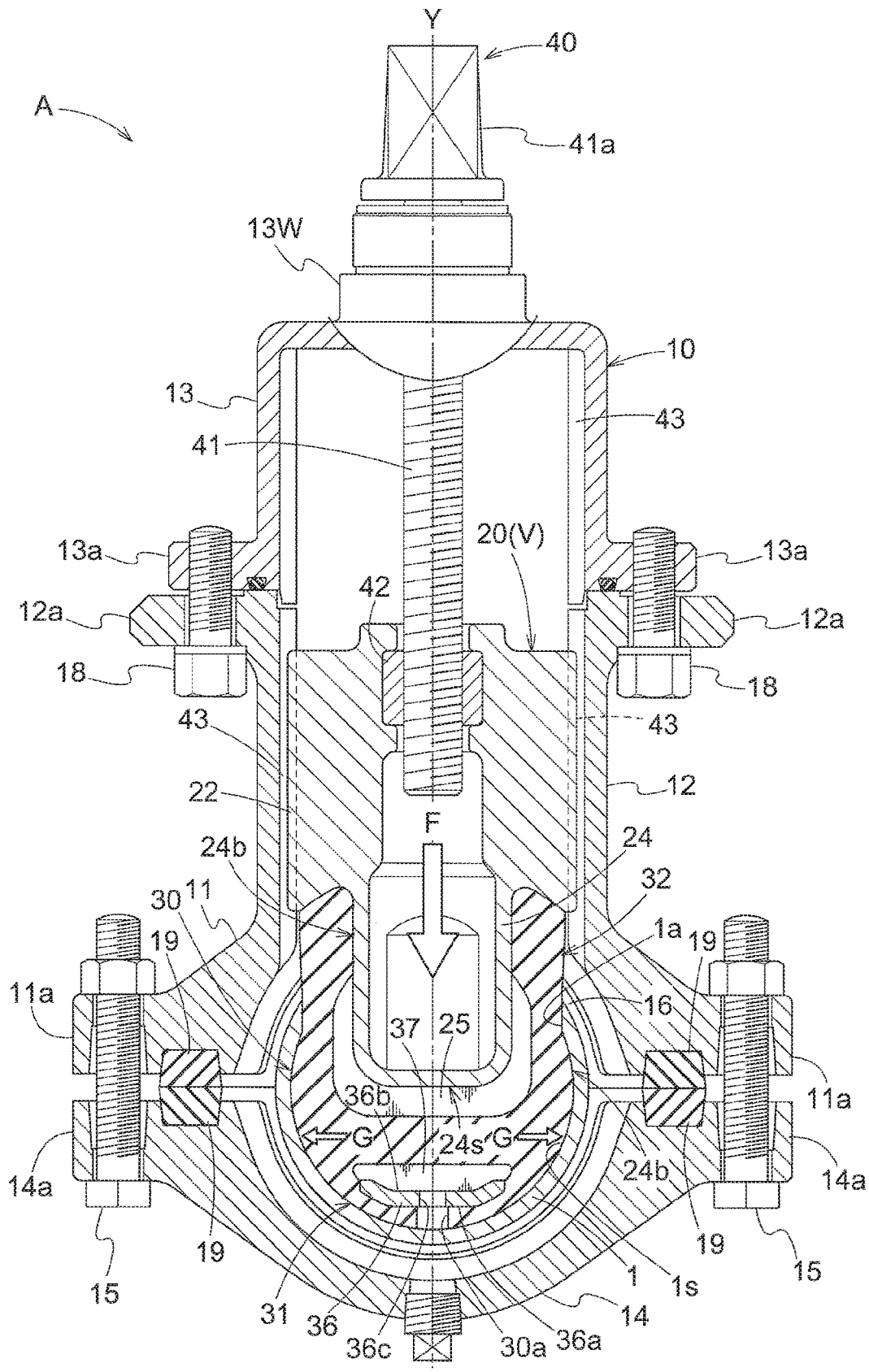
FIG. 3 is a vertical cross-sectional plan view of the gate valve in a state where a valve body has been inserted into the fluid pipe.

As shown in FIGS. 1 and 2, a gate valve A has a configuration in which a valve body V is inserted into a through-hole 1a that is formed in a water pipe 1, which is an example of a fluid pipe, and the flow of water (a fluid) is blocked by brining a seal member 30 of the valve body V into close contact with an inner wall 1s of the water pipe 1 as shown in FIG. 3, without cutting off the flow of water with an operation performed on an existing upstream valve or the like in the water pipe 1.

This gate valve A requires the formation of the through-hole 1a in the water pipe 1 with a predetermined technique, but has a configuration in which when the valve body V housed in a case 10 is inserted in an insertion direction F, which conforms to a shift axis Y (diameter direction of the water pipe 1) that is orthogonal to a pipe axis X of the water pipe 1, the seal member 30 of the valve body V elastically deforms in the insertion direction F and in a guide direction G that is orthogonal to the insertion direction F, and the seal member 30 is brought into close contact with the inner wall 1s of the water pipe 1 so as to block the flow of water.

Also, this gate valve A has a configuration in which when the flow of water in the water pipe 1 is blocked, the seal member 30 of the valve body V is in close contact with the portion surrounding the through-hole 1a, thus preventing water from flowing out through the through-hole 1a. Aspects of the elastic deformation of the seal member 30 during such water blockage will be described later.

(Gate Valve)

As shown in FIGS. 1 and 2, the gate valve A includes the case 10 that is a sealing structure that forms an interior space that is in communication with the through-hole 1a of the water pipe 1, the valve body V that is accommodated in the interior space of the case 10, and a movement mechanism 40 that moves the valve body V along the shift axis Y.

The case 10 includes a base end portion 11 that is shaped as a half cylinder and is arranged at a position covering the through-hole 1a of the water pipe 1, a cylindrical portion 12 that is integrated with the base end portion 11, and a mechanism support portion 13 that is shaped as a bottomed cylinder and is connected to the cylindrical portion 12, and the cylindrical portion 12 is held to the water pipe 1 by a holder 14 that is shaped as a half cylinder and is arranged on the side of the water pipe 1 opposite to the through-hole a.

Specifically, base-side projections 11a integrated with the base end portion 11 and holder-side projections 14a formed on the holder 14 are fastened to each other by fastening bolts 15, thus realizing a coupled state in which the base end portion 11 and the holder 14 sandwich the water pipe 1.

The case 10 includes a first packing 16 at a position that is on the inner circumferential surface of the base end portion 11 and the holder 14 and is in close contact with the outer circumferential surface of the water pipe 1, and includes a second packing 19 at a position at a boundary between the base end portion 11 and the holder 14. Adjustment bolts 17 for determining the orientation of the case 10 are screwed into end portions of the base end portion 11 and the holder 14.

Also, the cylindrical portion 12 and the mechanism support portion 13 are coupled to each other by using coupling bolts 18 to couple a first flange 12a formed at the opening portion of the cylindrical portion 12 and a second flange portion 13a formed on the mechanism support portion 13.

Note that when the through-hole 1a is to be formed in the water pipe 1, a punch device (not shown) is mounted to the holder 14, and a cutter of the punch device forms the through-hole 1a in the water pipe 1. This through-hole 1a is envisioned as being a circular hole, and after the through-hole 1a is formed, the outer wall portion cut by the punching is removed from the water pipe 1 along with chippings and the like. Thereafter, the case 10 is mounted to the holder 14 instead of the punch device.

(Gate Valve: Valve Body)

The valve body V is configured to include a valve main body 20 that is formed by a metal material such as iron or stainless steel, and a seal member 30 that is formed by an elastic member made of flexibly deforming rubber, resin, or the like.

As shown in FIGS. 1 to 5, the valve main body 20 includes a block-shaped portion 21, a pair of engaging pieces 22 that are shaped as plates that protrude outward and extend along the shift axis Y on the outer face of the block-shaped portion 21, and a brim-shaped portion 23 that is formed in a region surrounding the outer face of the block-shaped portion 21. Furthermore, the valve main body 20 includes a square bar-shaped holding portion 24 that is integrally formed extending along the shift axis Y from the brim-shaped portion 23.

A leading end face 24s, which is a flat surface that extends orthogonal to the shift axis Y, is formed at an end portion position on the extending side of the holding portion 24. Furthermore, main restriction walls 25 (one example of a second restriction wall), which project in the extending direction of the holding portion 24 and extend orthogonal to the pipe axis X, are formed parallel with each other on respective end portions in the pipe axis X direction at the end portion position on the extending side of the holding portion 24. Also, the main restriction walls 25 are arranged on respective sides in the pipe axis X direction at the leading end face 24s, and the main restriction walls 25 are formed in regions extending from the position of the leading end face 24s to the lateral face of the holding portion 24.

The valve main body 20 includes a hole portion that is concentric with the shift axis Y and extends from the block-shaped portion 21 to the holding portion 24, and a nut 42 that is concentric with the hole portion is non-rotatably provided in the block-shaped portion 21.

The seal member 30 is provided at a position covering the holding portion 24 of the valve main body 20, and includes a first contact face 31 that is formed at the projecting end in the insertion direction F (lower side in the insertion direction F) and has substantially the same radius as the water pipe 1, and a second contact face 32 that is formed on the lateral face connected to the first contact face 31.

Also, the seal member 30 is formed with a substantially constant thickness in the region from the first contact face 31 to the second contact face 32, and this thickness direction is a direction that conforms to the pipe axis X. Furthermore, a sealing portion 33 that is thicker than the aforementioned set thickness is formed in a region extending along the brim-shaped portion 23.

Furthermore, as shown in FIGS. 1 and 2, the seal member 30 includes a core member 36 that is embedded between the first contact face 31 and the leading end face 24s of the holding portion 24. The core member 36 is formed as a member that is separate from the holding portion 24, and is formed from a material that is harder than the material of the seal member 30, such as iron or stainless steel. An outer wall face 36a (one example of an opposing face) that gently curves along the first contact face 31 is formed on the leading end side in the insertion direction F of the core member 36, and a slightly recessed inner wall face 36b is formed on the opposite side.

Also, sub restriction walls 37 (one example of a first restriction wall) that rise upward toward the leading end face 24s and extend orthogonal to the pipe axis X are formed parallel with each other on the core member 36 at respective end positions in the pipe axis X direction, at positions opposing the leading end face 24s of the holding portion 24.

In particular, a second distance D2 from the leading end face 24s of the holding portion 24 to the inner wall face 36b of the core member 36 is set larger than a first distance D1 from the outer face of the seal member 30 on the insertion direction F side (first contact face 31) to the outer wall face 36a of the core member 36 (see FIG. 1).

The seal member 30 is formed by a die in a state where the core member 36 is inserted. Accordingly, a positioning hole 36c is formed in the core member 36 for insertion of a pin or the like for determining the position of the core member 36 inside the die at the time of molding, and the hole portion 30a is formed at the leading end of the seal member 30. Note that due to forming the hole portion 30a at the leading end of the seal member 30, when the valve body V has been inserted into the water pipe 1, even if particles of rust or the like are present on the inner wall is of the water pipe 1, such particles can pass through the hole portion 30a, thus enabling favorable water stopping.

Figure 4:
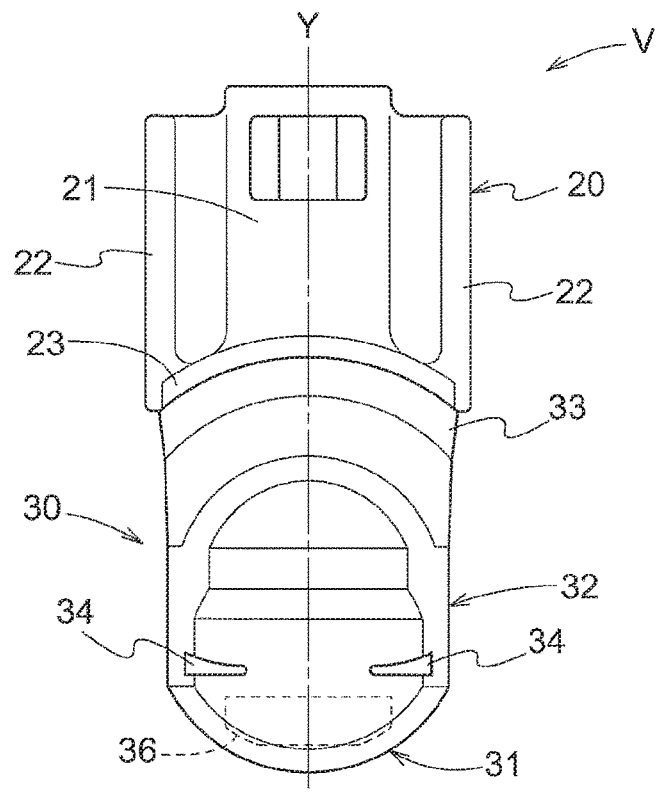
FIG. 4 is a plan view of the valve body.
Figure 5:
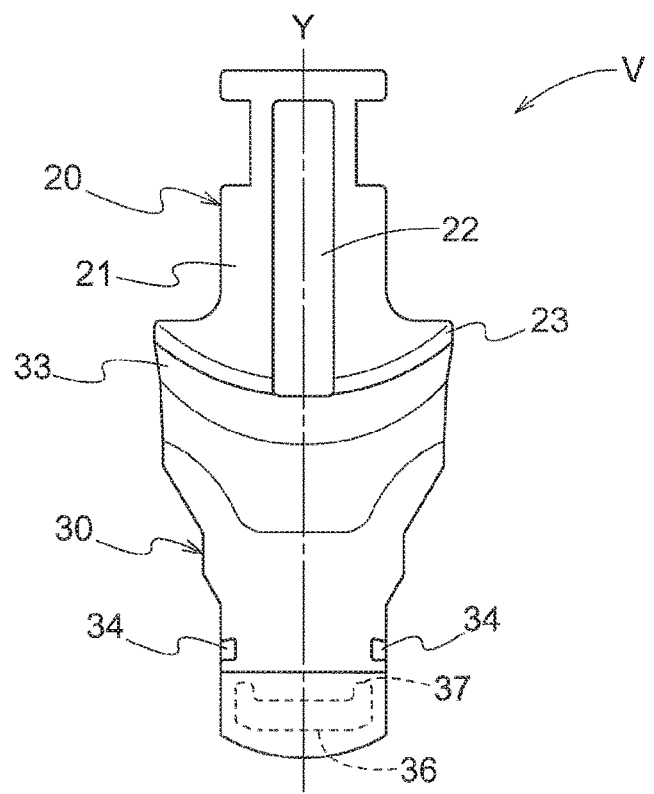
FIG. 5 is a side view of the valve body.

As shown in FIGS. 4 and 5, a slit 34 shaped as a groove that is elongated in the diameter direction is formed in the outer face of the seal member 30 at an intermediate position that is between the leading end face 24s of the holding portion 24 and the core member 36 in a view along the pipe axis X.

As shown in FIGS. 1 and 2, the seal member 30 is affixed to the entire circumference of the core member 36 and the outer face of an orthogonal wall face 24a of the holding portion 24 that is orthogonal to the pipe axis X, but is not affixed to a portion of a parallel wall face 24b that is parallel with the pipe axis X, the leading end face 24s, and inner faces of the pair of main restriction walls 25 (faces that oppose each other).

(Gate Valve: Movement Mechanism)

As shown in FIGS. 1 and 2, the movement mechanism 40 includes a threaded shaft 41 that has one end passing through an end portion wall 13W of the mechanism support portion 13 and is capable of rotating and not capable of moving in the thread shaft axial direction, the nut 42 provided in the valve main body 20 as previously described, and wall-shaped guide portions 43 that guide the engaging pieces 22 of the valve main body 20 on an inner face of the mechanism support portion 13.

An operation portion 41a for rotating the threaded shaft 41 is formed on the threaded shaft 41 at a position exposed to the outside of the mechanism support portion 13. Also, the guide portion is arranged in a relationship according to which the nut 42 of the valve main body 20 is screwed to the threaded shaft 41.

(Operation Aspect)

FIGS. 1 and 2 show the positional relationship before the valve body V is inserted into the through-hole 1a, and when the threaded shaft 41 is rotated in this state so as to move the valve body V in the insertion direction F for insertion through the through-hole 1a, the first contact face 31 of the seal member 30 comes into contact with the inner wall is of the water pipe 1 as shown in FIG. 3.

By further operating the threaded shaft 41 in this contact state, the seal member 30 becomes compressed along the insertion direction F (shift axis Y direction), and because the outer wall face 36a on the insertion direction F side of the core member 36 has a shape conforming to the inner wall is of the water pipe 1, pressure acts uniformly on the seal member 30 between the core member 36 and the inner wall is of the water pipe 1, and although the first distance D1 decreases slightly, the phenomenon of a large amount of local elastic deformation is suppressed.

When this compression occurs, the core member 36 becomes displaced in a direction of approaching the leading end face 24s of the holding portion 24, and therefore the second distance D2 decreases a large amount more than the first distance D1. Accordingly, compression force acts on the seal member 30 between the core member 36 and the leading end face 24s of the holding portion 24, and the seal member 30 attempts to undergo elastic deformation so as to bulge in a direction orthogonal to the insertion direction F.

In this state of attempted elastic deformation, the pair of main restriction walls 25 and the pair of sub restriction walls 37 suppress elastic deformation of the seal member 30 in the pipe axis X direction, and therefore the seal member 30 is caused to undergo elastic deformation in the guide direction G orthogonal to the insertion direction F with priority, thus bringing the second contact face 32 of the seal member 30 into contact with the inner wall is of the water pipe 1 and reliably blocking the flow of water.

Also, when the seal member 30 undergoes elastic deformation in the guide direction G orthogonal to the insertion direction F and the pipe axis X, the seal member 30 is not affixed to the portions of the parallel wall faces 24b of the holding portion 24 on the leading end side relative to the intermediate portion, the leading end face 24s, and the inner faces of the pair of main restriction walls 25 (faces that oppose each other), thus making it easy to cause elastic deformation to occur in a direction orthogonal to the insertion direction F and the pipe axis X, and making it possible to reduce the amount of operation force required for the compression operation.

Furthermore, because the slit 34 is formed in the seal member 30, in the case where the seal member sandwiched between the leading end face 24s of the holding portion 24 and the inner wall face 36b of the core member 36 becomes compressed, and a portion thereof undergoes elastic deformation so as to bulge in the pipe axis X direction, by increasing the groove width of the slit 34, it is possible to facilitate elastic deformation of the seal member 30 and reduce the amount of operation force required for the compression operation.

(Actions and Effects of Embodiment)

In this way, the core member 36 is embedded in the seal member 30 that constitutes the gate valve A, the orientation of the leading end face 24s of the holding portion 24 is set, the relative positional relationship between the core member 36 and the holding portion 24 of the valve main body 20 is set, and the relative distance therebetween is set, and accordingly, if pressure acts along the insertion direction F, strong pressure acts on the seal member 30 between the leading end face 24s of the holding portion 24 and the inner wall face 36b of the core member 36, and it is possible to apply compressive force to the seal member 30 in this portion with a reduced load.

Also, the pair of main restriction walls 25 are formed on portions of the leading end face 24s of the holding portion 24, and the pair of sub restriction walls 37 are formed on the core member 36. According to this configuration, if pressure acts between the leading end face 24s of the holding portion 24 and the core member 36, the direction of elastic deformation of the seal member 30 caused by such pressure is set to the guide direction G that is orthogonal to the pipe axis X and orthogonal to the insertion direction F, thus bringing the second contact face 32 of the seal member 30 as well into close contact with the inner wall is of the water pipe 1 and completely blocking the flow of water.

Furthermore, the seal member 30 is not affixed to the leading end sides, relative to the intermediate portion, of the parallel wall faces 24b of the holding portion 24 at positions opposing the inner wall is of the water pipe 1, the leading end face 24s, and the inner faces of the pair of main restriction walls 25, and the slit 34 is formed in the surface of the seal member 30, thus facilitating elastic deformation of the seal member 30 when compressive force is applied, and reducing the load required when operating the threaded shaft 41.

Other Embodiments

Besides the embodiment described above, the present invention may be configured as follows (the same reference signs and number are used for members having the same functions as in the embodiment).

(a) The gate valve A is not limited to use with the water pipe 1, and may be used to block the flow of a fluid in a fluid pipe for the flow of a fluid other than water or gas.

(b) The number of main restriction walls 25 (second restriction walls) and sub restriction walls 37 (first restriction walls) may be three or more, or they may be omitted.

(c) The leading end face 24s of the holding portion 24 may be formed as a face having a curvature smaller than (face having a larger radius of curvature than) the curvature of the water pipe 1 (fluid pipe). In other words, the leading end face 24s of the holding portion 24 can also be formed as a face that protrudes slightly or recedes slightly.

(d) The shape and depth of the slit 34 can be set as desired, and the slit 34 may be omitted.

(e) A valve body VA shown in FIGS. 6 to 9 may be configured instead of the valve body V described above. The valve body VA is configured to include a valve main body 20A that is formed by a metal material such as iron or stainless steel, and a seal member 30A that is formed by an elastic member made of flexibly deforming rubber, resin, or the like.

Figure 6:
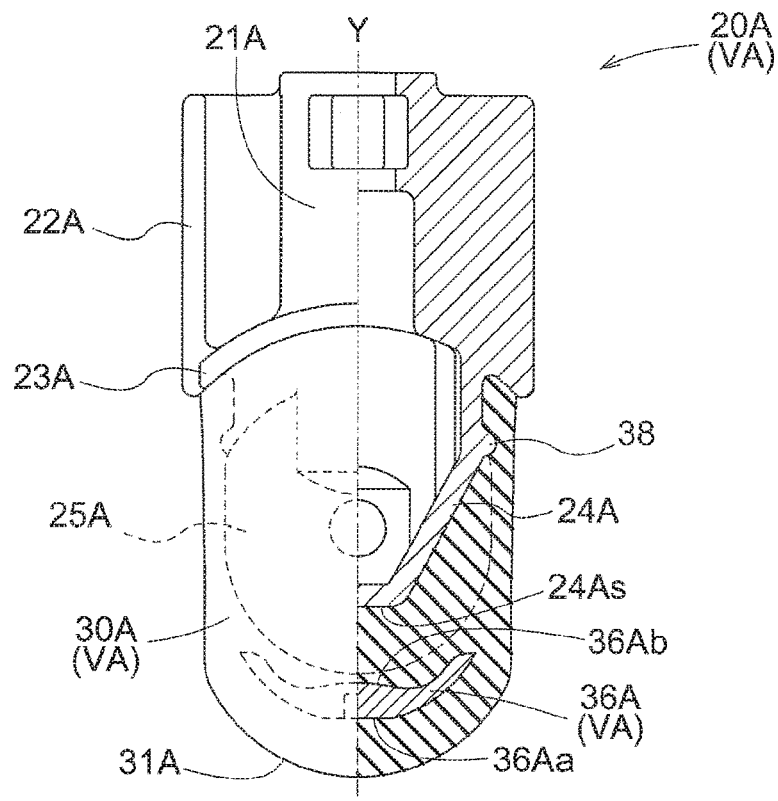
FIG. 6 is a vertical cross-sectional plan view of a valve body according to another embodiment.
Figure 7:
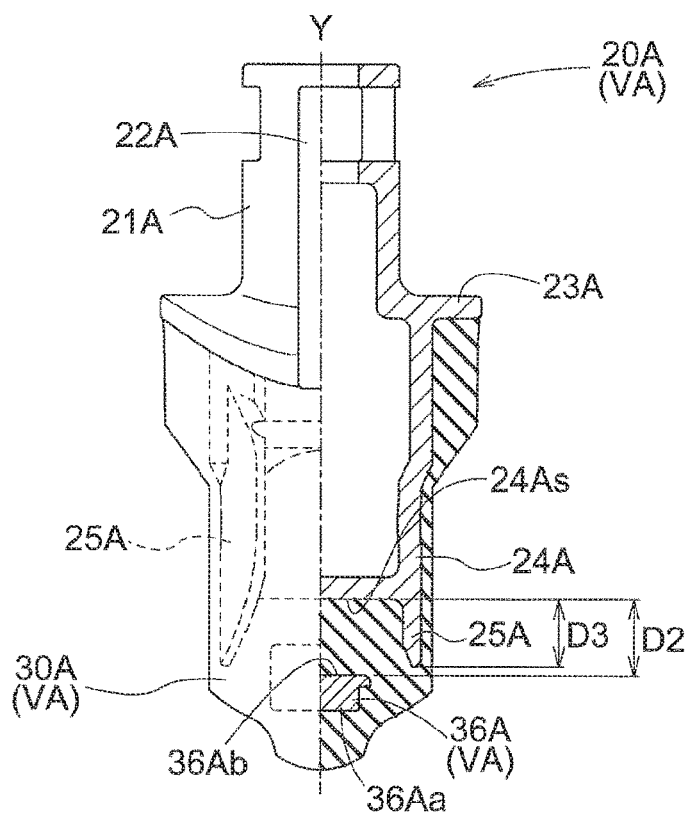
FIG. 7 is a vertical cross-sectional side view of the valve body according to the other embodiment.
Figure 8:
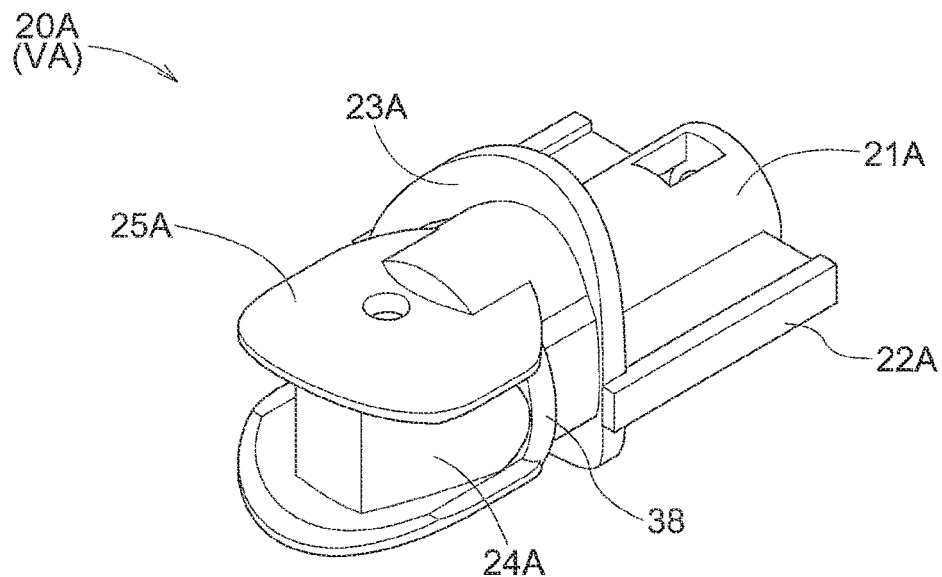
FIG. 8 is a perspective view of a valve main body according to the other embodiment.

As shown in FIGS. 6 to 8, the valve main body 20A includes a block-shaped portion 21A that is shaped as a cylinder, a pair of engaging pieces 22A that are shaped as plates that protrude outward and extend along the shift axis Y on the outer face of the block-shaped portion 21A, and a brim-shaped portion 23A that extends along the circumferential direction at the end portion of the block-shaped portion 21A. Furthermore, the valve main body 20A includes a square cylinder-shaped holding portion 24A that is integrally formed extending along the shift axis Y from the brim-shaped portion 23A.

As shown in FIGS. 6 to 9, a core member 36A is formed separately from the holding portion 24A, and is formed from a material that is harder than the seal member 30A, such as iron or stainless steel. An outer wall face 36Aa that gently curves along a first contact face 31A is formed on the leading end side in the insertion direction F of the core member 36A, and an inner wall face 36Ab that bulges from the curved face is formed on the opposite side. The core member 36A of the present embodiment does not include the sub restriction walls 37 of the core member 36 described above, but may include the sub restriction walls 37.

Figure 9:
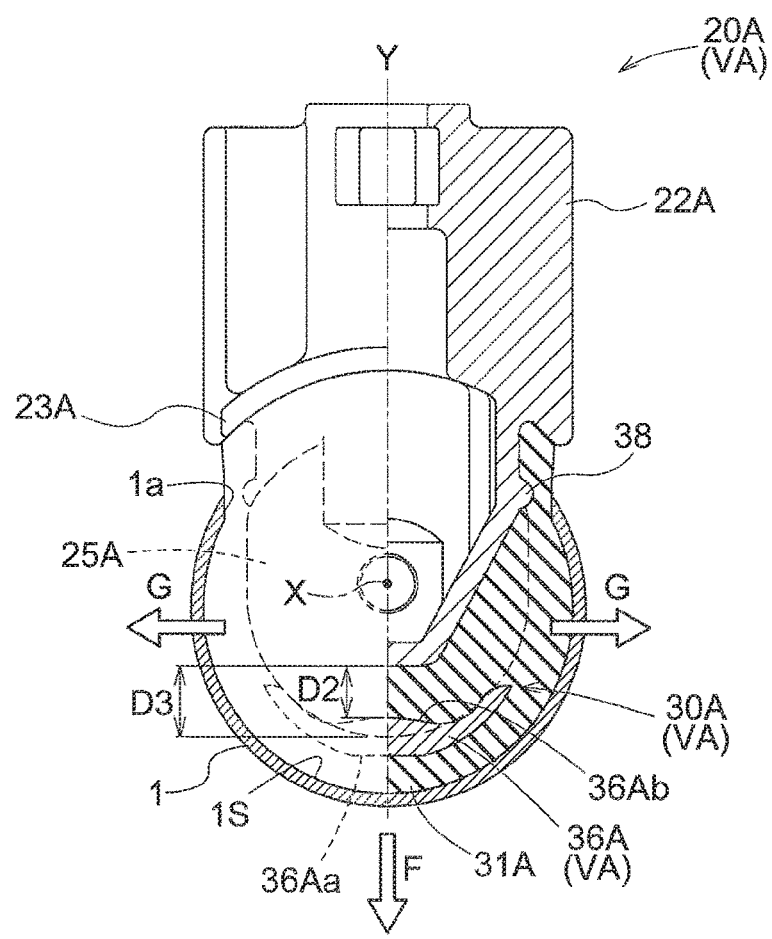
FIG. 9 is a vertical cross-sectional plan view of the gate valve in a state where the valve body has been inserted into the fluid pipe in the other embodiment.

Furthermore, main restriction walls 25A (one example of a second restriction wall), which project in the extending direction of the holding portion 24 and extend orthogonal to the pipe axis X, are formed parallel with each other on respective end portions in the pipe axis X direction of the holding portion 24. As shown in FIG. 9, with the main restriction walls 25A of the present embodiment, when the seal member 30A comes into close contact with the inner wall is of the water pipe 1 to block the flow of water in the water pipe 1, at least a portion of the core member 36A becomes overlapped in a view along the pipe axis X of the water pipe 1. Specifically, a projecting amount D3 of the main restriction walls 25A from the leading end face 24As of the holding portion 24A is larger than the second distance D2 from the leading end face 24As of the holding portion 24A to the inner wall face 36Ab of the core member 36A when the valve body VA is inserted into the water pipe 1 and the seal member 30A is in the most compressed state (see FIG. 9). Note that in the present embodiment, before the valve body VA is inserted into the water pipe 1 (before the seal member 30A is compressed), the projecting amount D3 of the main restriction walls 25A from the leading end face 24As of the holding portion 24A is smaller than the second distance D2 from the leading end face 24As of the holding portion 24A to the inner wall face 36Ab of the core member 36A (see FIG. 7). Alternatively, a configuration is possible in which the projecting amount D3 of the main restriction walls 25A from the leading end face 24As of the holding portion 24A is larger than the second distance D2 from the leading end face 24As of the holding portion 24A to the inner wall face 36Ab of the core member 36A before the seal member 30A is compressed.

Similarly to the embodiment described above, the seal member 30 is not affixed to the side faces of the holding portion 24 sandwiched between the pair of main restriction walls 25A, the leading end face 24s, and the inner faces of the pair of main restriction walls 25 (faces that oppose each other).

In the present embodiment, even if fluid pressure acting in the pipe axis X direction applies force to the seal member 30A and the core member 36A so as to move in the pipe axis X direction, movement of the core member 36A is prevented by the main restriction walls 25A. This consequently suppresses the case where the seal member 30A between the leading end face 24As of the holding portion 24A and the core member 36A bulges in the pipe axis X direction. Accordingly, by moving the valve main body 20A in the insertion direction F, it is possible to cause the seal member 30A to deform in the guide direction G orthogonal to the insertion direction F and maintain a state of being in close contact with the inner wall is of the water pipe 1.

Also, in addition to projecting in the extending direction of the holding portion 24, the main restriction walls 25A of the present embodiment also project from the holding portion 24 in the guide direction G that is orthogonal to the insertion direction F and the pipe axis X. Accordingly, it is possible to further suppresses the case where the seal member 30A between the leading end face 24As of the holding portion 24A and the core member 36A bulges in the pipe axis X direction.

Also, on the base end side, which is the rear side in the insertion direction F, of the holding portion 24A of the valve body VA of the present embodiment, a restricting protrusion portion 38 is formed protruding outward at a position between the pair of main restriction walls 25A, and the restricting protrusion portion 38 restricts movement in the direction opposite to the insertion direction F of the seal member 30A. The restricting protrusion portion 38 is set so as to be located in the vicinity of the through-hole 1a of the water pipe 1 (a location corresponding to the through-hole 1a in the diameter direction of the water pipe 1) when the seal member 30A comes into close contact with the inner wall is of the water pipe 1 to block the flow of water in the water pipe 1 (see FIG. 9).

When the valve main body 20A is moved in the insertion direction F, the restricting protrusion portion 38 suppresses bulging of the seal member 30A in the direction opposite to the insertion direction F of the holding portion 24A. As a result, by moving the valve main body 20A in the insertion direction F, it is possible to sufficiently ensure the deformation amount of the seal member 30A with respect to deformation in the guide direction G orthogonal to the insertion direction F. Moreover, the seal member 30A is not likely to bulge in the direction opposite to the insertion direction F, and therefore by moving the valve main body 20A in the insertion direction F, it is possible to prevent a defect in which the seal member 30A abuts against the through-hole 1a of the water pipe 1 and becomes damaged. Other configurations, actions, and effects are similar to those in the embodiment described above, and therefore will not be described in detail.

INDUSTRIAL APPLICABILITY

The present invention is applicable to a gate valve that includes a valve body that blocks a passage of a fluid pipe.

REFERENCE SIGNS LIST 1 water pipe (fluid pipe)
1a through-hole
1s inner wall
20 valve main body
20A valve main body
24 holding portion
24A holding portion
24s leading end face
25 main restriction wall (second restriction wall)
30 seal member
30A seal member
31 first contact face (outer face on insertion direction side)
34 slit
36 core member
36A core member
36a outer wall face (opposing face)
37 sub restriction wall (first restriction wall)
37A sub restriction wall (first restriction wall)
38 restricting protrusion portion
40 movement mechanism
A gate valve
D1 first distance
D2 second distance
V valve body
X pipe axis

The invention claimed is:

1. A gate valve comprising:
a valve body that is to be inserted into a fluid pipe through a through-hole formed in the fluid pipe, by movement in an insertion direction that conforms to a diameter direction of the fluid pipe; and
a movement mechanism that moves the valve body in the insertion direction,
wherein the valve body includes a valve main body and a seal member that is capable of undergoing elastic deformation and is provided on the valve main body in a region that covers a holding portion that protrudes in the insertion direction, and when the valve body is moved in the insertion direction by the movement mechanism such that the seal member comes into contact with an inner wall of the fluid pipe and undergoes elastic deformation, the seal member comes into close contact with the inner wall of the fluid pipe and blocks a flow of a fluid in the fluid pipe,
a core member that is separate from the holding portion and is formed by a harder material than the seal member is embedded between an outer face of the seal member on an insertion direction side and a leading end face on a protruding side of the holding portion, and
a second distance from the leading end face of the holding portion to an opposing face of the core member is set larger than a first distance from the outer face of the seal member to an opposing face of the core member.

2. The gate valve according to claim 1, wherein first restriction walls are formed on an opposing face of the core member that opposes the leading end face of the holding portion, the first restriction walls rising toward the leading end face and extending orthogonal to a pipe axis of the fluid pipe at respective end positions of the opposing face in a direction conforming to the pipe axis.

3. The gate valve according to claim 1, wherein the leading end face of the holding portion is formed as a flat face that extends orthogonal to the insertion direction.

4. The gate valve according to claim 1, wherein second restriction walls are formed on the leading end face of the holding portion, the second restriction walls rising toward the core member and extending orthogonal to a pipe axis of the fluid pipe at respective end positions of the leading end face in a direction conforming to the pipe axis.

5. The gate valve according to claim 4, wherein the second restriction wall is formed such that when the seal member comes into close contact with the inner wall of the fluid pipe to block the flow of the fluid in the fluid pipe, at least a portion of the core member becomes overlapped with the second restriction wall in a view along a pipe axis of the fluid pipe.

6. The gate valve according to claim 4, wherein a restricting protrusion portion that restricts movement of the seal member in a direction opposite to the insertion direction is formed at a position between the pair of second restriction walls on a base end side of the holding portion.

7. A gate valve comprising:
a valve body that is to be inserted into a fluid pipe through a through-hole formed in the fluid pipe, by movement in an insertion direction that conforms to a diameter direction of the fluid pipe; and
a movement mechanism that moves the valve body in the insertion direction, wherein
the valve body includes a valve main body and a seal member that is capable of undergoing elastic deformation and is provided on the valve main body in a region that covers a holding portion that protrudes in the insertion direction, and when the valve body is moved in the insertion direction by the movement mechanism such that the seal member comes into contact with an inner wall of the fluid pipe and undergoes elastic deformation, the seal member comes into close contact with the inner wall of the fluid pipe and blocks a flow of a fluid in the fluid pipe,
a core member that is separate from the holding portion and is formed by a harder material than the seal member is embedded between an outer face of the seal member on an insertion direction side and a leading end face on a protruding side of the holding portion, and
a slit shaped as a groove that is elongated in a diameter direction of the fluid pipe is formed in an outer face of the seal member at a position that is between the leading end face of the holding portion and the core member in a view along a pipe axis of the fluid pipe.

* * * * *